(12) United States Patent  
Chirnomas

(10) Patent No.: US 7,118,009 B2
(45) Date of Patent: Oct. 10, 2006

(54) DISPLACEABLE BARRIER

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 155 days.

(21) Appl. No.: 10/654,361

(22) Filed: Sep. 3, 2003

(65) Prior Publication Data

US 2004/0079761 A1 Apr. 29, 2004

Related U.S. Application Data

(63) Continuation-in-part of application No. PCT/US03/06051, filed on Feb. 26, 2003.

(60) Provisional application No. 60/360,128, filed on Feb. 26, 2002.

(51) Int. Cl.
*G07F 11/14* (2006.01)
(52) U.S. Cl. .................................. 221/150 R
(58) Field of Classification Search .......... 221/63, 221/303, 310, 307, 308, 150 R, 92, 123, 221/124, 9, 13, 150 HC; 62/448
See application file for complete search history.

(56) References Cited

U.S. PATENT DOCUMENTS 2,323,841 A * 7/1943 Pape et al. ................. 221/92
2,648,429 A * 8/1953 Smith ....................... 221/308

* cited by examiner

*Primary Examiner*—David H. Bollinger
(74) *Attorney, Agent, or Firm*—Lawrence C. Edelman, Esq.

(57) ABSTRACT

A vending machine apparatus comprising a housing defining an internal cavity and an article storage compartment positioned inside the cavity. The article storage compartment may have a cooling unit associated therewith for cooling the article storage compartment. The article storage compartment is subdivided into a plurality of article storage sub-compartments, each sub-compartment having an opening at a dispensing end thereof for passage therethrough during a dispensing operation of articles stored therein. An air barrier arrangement is positioned so as to be in common with the dispensing end of a plurality of said sub-compartments, for separating the interior of the sub-compartments from the remainder of the interior of the internal cavity, the air barrier arrangement having flaps that operate individually with respective ones of said sub-compartments, so as to allow articles stored in the sub-compartments to pass therethrough during the dispensing operation.

27 Claims, 6 Drawing Sheets

DISPLACEABLE BARRIER

CROSS-REFERENCE TO RELATED APPLICATIONS

This application is a Continuation-In-Part application, and claims priority under 35 USC 120, of International Application PCT/US03/06051, filed on Feb. 26, 2003, entitled "Thermal Barrier For A Refrigerated Compartment In A Vending Machine", which was filed in English and designated the US, and which itself claimed priority under 35 USC 119 of U.S. Provisional Patent Application No. 60/360,128 filed Feb. 26, 2002, entitled "Thermal Barrier For A Refrigerated Compartment In A Vending Machine". The entire disclosure of these patent applications are incorporated herein by reference in their entirety.

SUMMARY OF THE INVENTION

The present invention is directed to a method and apparatus for providing a displaceable barrier at an open end of an article storage compartment. More particularly, the present invention provides a displaceable barrier, such as a plurality of displaceable flaps, across an access opening of an article storage compartment in a refrigerated (i.e., frozen or merely cooled) vending machine. The flaps help prevent mixing of the thermal environments on opposite sides of the displaceable barrier.

BRIEF DESCRIPTION OF THE DRAWINGS

The accompanying drawings, which are incorporated herein and constitute part of this specification, illustrate exemplary embodiments and details of the invention, and, together with the general description given above and the detailed description given below, serve to explain features of the invention.

DETAILED DESCRIPTION OF THE PREFERRED EMBODIMENT

Figure 1:
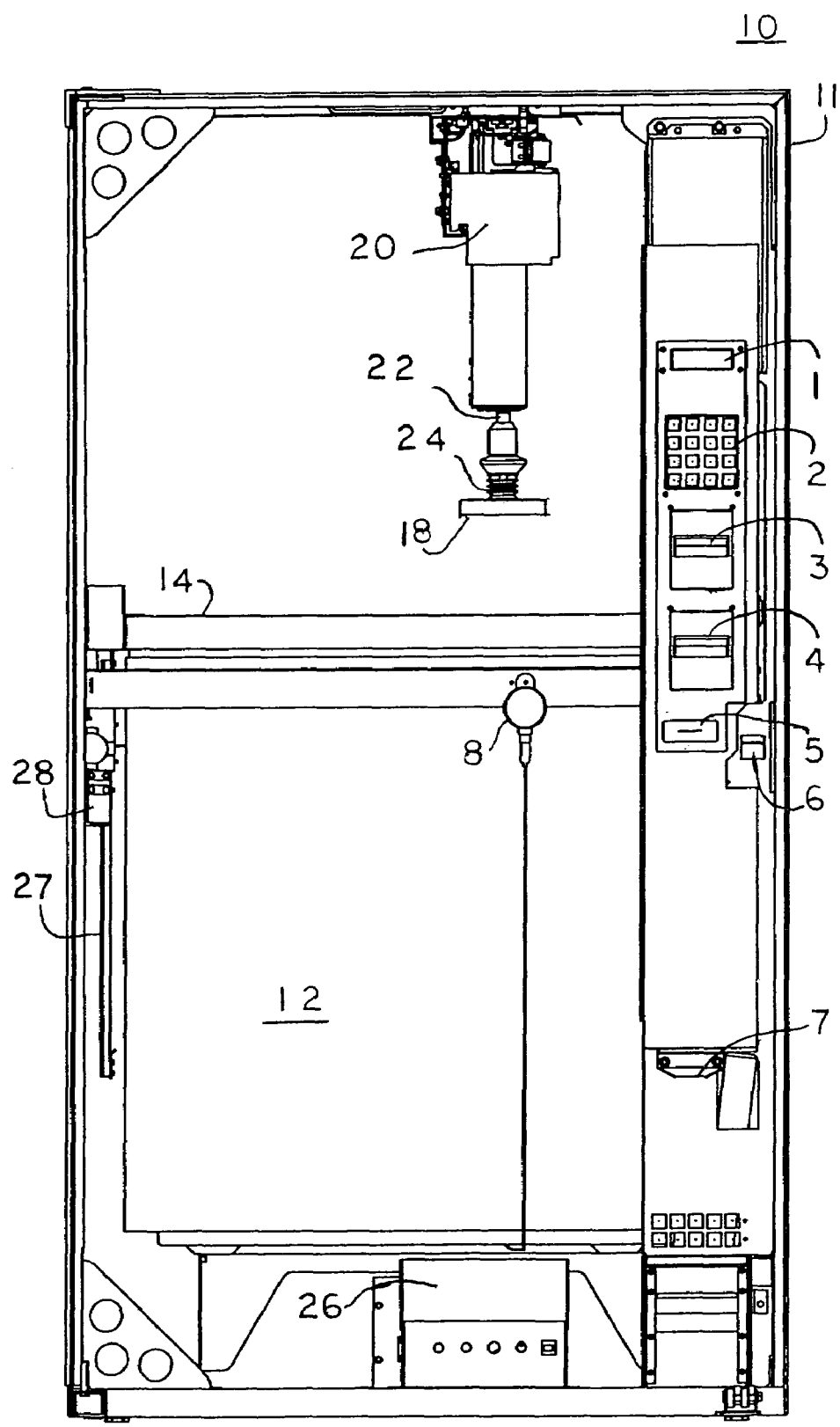
FIG. 1 is a front section view of a vending machine useful for illustrating an environment for the present invention. The vending machine includes a refrigerated article storage compartment, and has a displaceable thermal separating door for separating the access opening in the dispensing end of a refrigerated article storage compartment from the remainder of the interior of the vending machine.

FIG. 1 illustrates front section view of a vending machine 10 useful for illustrating an environment for the present invention. Machine 10 has an outer housing 11 and hinged front door (not shown to aid clarity) for forming a cabinet for the vending machine. Machine 10 may substantially correspond in structure and operation to the vending machine shown in my prior U.S. Pat. No. 5,240,139 (incorporated herein by reference), and includes the conventional components of such as machine, such as a display 1, selection keypad 2, bill validator 3, credit card reader 4, coin insert slot 5, coin return lever 6, and coin return chute 7 and a control mechanism therefore, not shown. Thus only basic details relating to the vending machine are provided herein.

As described in my prior patent, machine 10 includes therein a refrigerated insulated compartment 12 for storing articles to be vended. It is noted that compartment 12 may be of the "static" type, which has cold generating evaporator coils distributed along and in thermal contact with the inside walls which form the main interior volume of compartment 12, and heat dissipating condenser coils thermally insulated from the evaporator coils and distributed along and in thermal contact with the walls which form the outside perimeter of storage compartment 12. With this type of freezer, no fans are required for the refrigeration system since the cooling effect of the evaporator coils is directly radiated to the interior of compartment 12, and the heat generated by the refrigeration system is directly radiated by the outside walls of compartment 12 to the external environment. A combined thermocouple and temperature indicator 8, of conventional design and operation is used by refrigerated compartment 12 for maintaining and indicating the set temperature. Such chest freezers are commonly available from any one of many well known sources for appliances. Other techniques for developing a cooled environment in compartment 12 could just as easily be used with the present invention, such as what is conventionally known as a forced air system, having a separate refrigeration unit for developing cooled air, which cooled air is then directed, using for example air ducts, to the interior of compartment 12.

Figure 2:
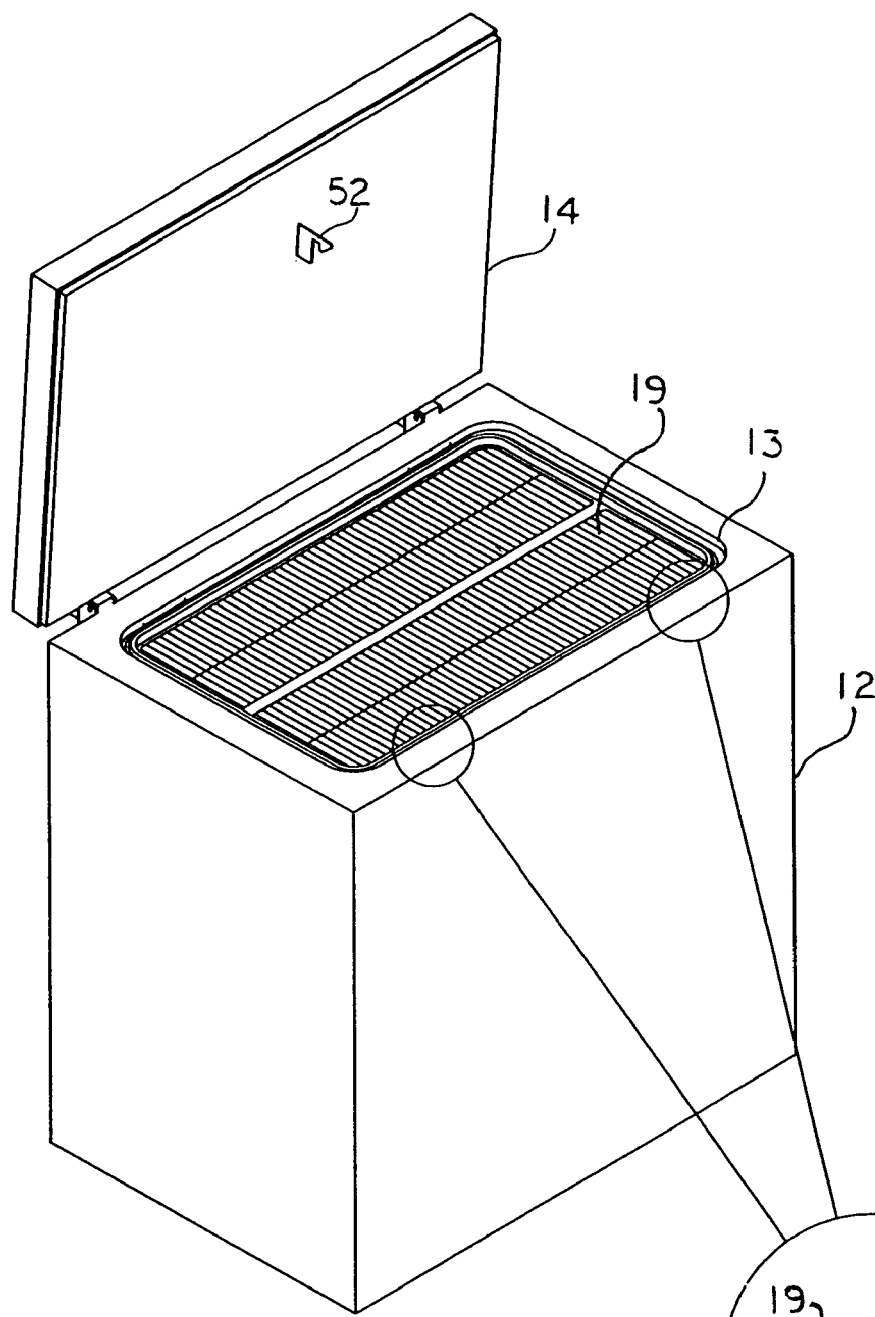
FIGS. 2 and 2A illustrate a perspective and detailed view of a displaceable barrier arrangement held in a position across the dispensing access opening of the refrigerated article storage compartment shown in FIG. 1, the displaceable barrier being constructed in accordance with the principles of the invention.
Figures 3, 3A:
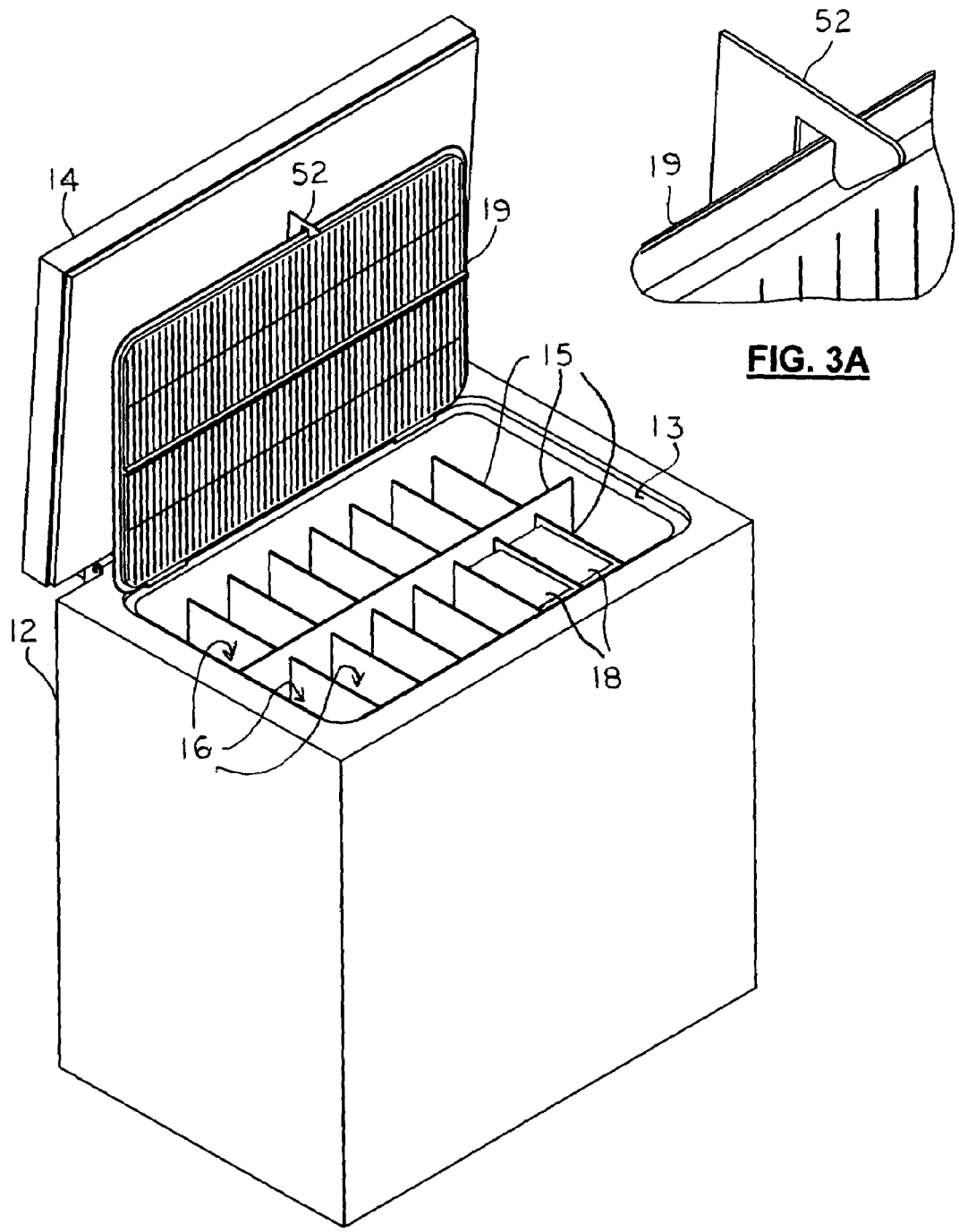
FIGS. 3 and 3A illustrate a perspective and detailed view of the FIG. 2 arrangement, with the barrier shown being held in a raised position, in accordance with an aspect of the present invention.

In one embodiment, and as shown in greater detail in FIGS. 2 and 3, refrigerated compartment 12 has associated therewith a displaceable thermal separating door 14 positioned over an opening 13 in one side, in this case the topside, of compartment 12. Door 14 provides a thermal separation at the opening 13 between the remainder of the interior of the vending machine and the interior of compartment 12. My above-noted U.S. Pat. No. 5,240,139 shows and describes several different embodiments for door 14, including the single-piece hinged door as shown herein, as well as several "sliding" door designs. It is also noted that an "air curtain" can also form a thermal barrier that functions as a door, and in fact a purposefully constructed thermal barrier may not be required and instead merely having an air gap over compartment 12 may in some situations be sufficient for effective operation of the vending machine, since cold air sinks, and therefore tends to stay within compartment 12 when left undisturbed.

As shown in FIG. 3, compartment 12 includes therein a plurality of divider walls 15 positioned so as to form a plurality of sub-compartments 16. Sub-compartments 16 are adapted for storing articles 18 that need to be frozen or refrigerated,(such as ice cream or other foods) in the cooled environment of compartment 12 until they are selected to be dispensed by a user of vending machine 10. To aid clarity of illustration, only two of sub-compartments 16 are shown to be filled with articles 18, although in normal operation, the sub-compartments 16 would be filled to near the top with articles 18 upon restocking of machine 10 by an operator, and sub-compartments 16 would be gradually depleted of the articles as the machine 10 is used by its customers. The air barrier 19 of the present invention is shown in FIG. 3 in a raised position for restocking of compartment 12, and will be described in greater detail later in the description.

In operation, after a user of the vending machine has inserted the proper payment and made a valid selection of an item stored in the vending machine (usually based on a graphical display illustrated on the front door of the machine, not shown), a control mechanism 26 of machine 10, of conventional design, generates control signals which cause freezer door 14 to become raised, via a rack 27 which is raised/lowered by a reversible motor 28 for pivotally engaging, and correspondingly raising/lowering, door 14. Further details of the freezer door opening/closing mechanism can be found in my published U.S. patent application Ser. No. 10/402,174 filed Mar. 27, 2003, incorporated herein by reference. The control mechanism then causes an article pickup carriage 20 having a suction hose 22 and pickup head 24 hanging therefrom, to be laterally positioned over a predetermined one of the sub-compartment 16 in which at least one of the selected articles 18 have been stored. Next, the control mechanism 26 causes a motor (not shown) in carriage 20 to operate a drive roller arrangement in contact with hose 22, so that the article pickup head 24 is controllably lowered into the selected compartment 22, suction generated by a blower motor (not shown) is conducted thereto via hose 22, and an article 18 stored in the selected sub-compartment 16 thereby becomes secured to the article pickup head 24. The motor in carriage 20 is operated again, this time in a reverse direction, so as to extract article pickup head 24 with the selected article from compartment 16, and then deposit the selected article 18 in a customer retrieval area (not shown, but customarily an area near the bottom of the front door of machine 10), by removing the suction force from pickup head 24 when the pickup head 24 is in positioned over the open top of the customer retrieval area.

In view of the public availability of my above-noted US patent and my more recent embodiments of robotic vendors such as shown in my PCT/US01/16894 (Publication No. WO 01/95276), filed in English, designation the United Sates, and also incorporated herein by reference), no further description of how to make and use a vending machine of the type described so far, is considered necessary.

An important function of freezer door 14 is to provide a thermal barrier between the inside of freezer 12, and the remaining area inside of housing 11. The thermal barrier helps keep the cool/dry conditioned air that is inside the freezer separate from the ambient air, which is both inside and outside of the housing 11. However, during normal machine operation, thermal barrier provided by door 14 between the cooled and unconditioned ambient areas, is opened and closed many times in order to dispense the articles stored in compartment 12. Each opening and closing causes/allows air currents to repeatedly introduce unconditioned air from housing 11 into the cooled and conditioned air environment of compartment 12. Although cold air is heavier than warm air, and tends to stay in the storage compartment 12 when the door 14 is opened, typically there is some unwanted mixing of the ambient air with the conditioned air at the top of the storage compartment 12 and near access opening 13. This unwanted mixing is at least partially due to air currents caused by the opening and closing of door 14 (especially if it comprises a single piece hinged lid), as well as movements of the picker head, and other parts of machine 10, thereby introducing unwanted heat and moisture into the freezer compartment.

The introduction of warm air into compartment 12 is obviously undesirable, since its contact with the stored articles will incrementally raise their temperature, as well as the overall temperature in compartment 12, and can thereby over time degrade the quality the stored articles. The introduction of humid or moist air is also undesirable, since the moisture in that air tends to form frost (ice) that will incrementally build-up on the internal wall dividers 15 of compartment 12, and can thereby offset proper positioning of dividers 15 and the stored articles 18, and consequently improper operation of machine 10. Additionally, the formation of the frost reduces the thermal and operational efficiency of the freezer, as well as reducing the internal size of compartment 12. Although most of this unwanted hot and/or humid air comprises, and therefore changes with, the ambient air conditions at the location of machine 10, even on days when the ambient air condition at the location is favorable, unwanted hot and/or humid air is necessarily being generated by the normal operation of the above described compressor and condenser components of the freezer 12.

Accordingly it is one object of the present invention to reduce this unwanted mixing of the unconditioned ambient air into compartment 12, irrespective of whether a physical door is used over the access opening 13 of the freezer.

FIG. 2 illustrates one embodiment of the present invention, where a displaceable thermal barrier 19 is provided at the dispensing end, i.e., access opening 15 of the freezer 12. It is noted that this displaceable thermal barrier would be useful in addition to the thermal barrier function provided by the door 14. Alternatively, in some embodiments, a door 14 may not be required.

Figure 4:
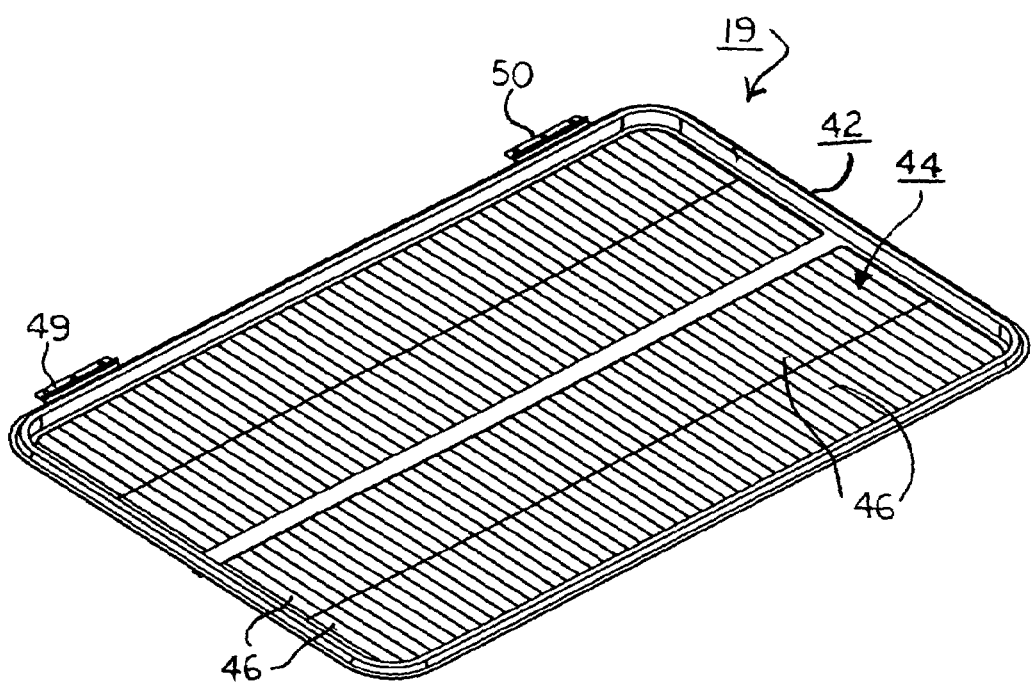
FIG. 4 illustrates a perspective view a the displaceable barrier shown in FIGS. 2 and 3.

FIG. 2 shows barrier 19 in the closed, i.e., normal operational position. As shown in FIG. 4, barrier 19 comprises an outer ring-shaped portion 42, and an inner sheet like portion 44 having a plurality of uniformly distributed opposed pairs of flexible flaps or fingers 46 formed therein.

In the illustrated embodiment the shape of the opposed flaps 46 is rectangular, but other shapes could be used. It is also noted that the width of the rectangular flaps 44 could be made much narrower (so as to almost approach a string-like shape) or wider (so as to approach the width of a single article storage sub-compartment 16). Other orientations of the flaps are also possible, such as a perpendicular arrangement (i.e., one shifted ninety degrees from the arrangement shown herein), or even a radial arrangement of the flaps, located in one or more sections of portion 44, as may be appropriate for the location and shape of a corresponding sub-compartment aligned thereunder.

Additionally, although in the illustrated embodiment the flaps are arranged in opposed pairs, since this arrangement results in the opposed ends of the flaps meeting at the center of the article storage sub-compartments 16 that are aligned thereunder, other arrangements are possible and may be particularly advantageous in some environments, such as a single longer flap in place of each opposed pair of flaps.

It is noted that the use of longer flaps in the place of opposed pairs of flaps would result in a deflection depth during dispensing that is greater than the deflection depth of an opposed pair of flaps. Additionally, due to the flexibility of the flaps 44, even in their stead state condition they will have a normal tendency to droop, and the greater length of the flap, the greater the depth of the droop. Having a short deflection depth is generally advantageous since it leaves more space under the barrier for the articles to be stacked higher in the article storage sub-compartments 16. For at least these reasons, longer flaps may not be desirable in some situations. Thus, some "dead space" between the underside of barrier and the top of sub-compartments 16 is desirable so as to provide for the deflection of the flaps 44 during dispensing, as well as for establishing a substantially trapped, and therefore stagnant air gap above the article storage sub-compartments 16. This air gap tends to isolate and insulate the conditioned air environment inside compartment 12 from the ambient and unconditioned air environment inside the remainder of housing 11.

In operation, when the picker head 24 is lowered into a selected sub-compartment 16 to retrieve a selected article, only those flaps 46 which are in that portion 44 that are in the downward path of the picker head 24 will be deflected inward by the weight of the picker head 24, while the remainder of the flaps are not deflected. Similarly, when the selected article 18 is removed from the sub-compartment 16, only those flaps that are positioned over that sub-compartment 16 holding the selected article 18 will be deflected outward to allow for the passage therethrough of the picker head and selected article secured thereto. The flexibility of the flaps 46 is adapted to be sufficient so that the suction force holding article 18 to the picker head 24 is not overcome. After the pickup head and secured article have been fully removed from the sub-compartment 16, the flaps 46 are pre-biased so as to return to their normally closed position over the access opening 13, thereby quickly and effectively preventing unwanted air currents from entering that storage sub-compartment 16. Additionally, the flaps 46 positioned over the open tops of the other ones of storage sub-compartments 16 are not displaced, and these flaps also are useful for preventing the introduction of ambient air into these other sub-compartments 16. Thereafter, a common door 14, if one is used, would be positioned over the top of compartment 12, for providing even further thermal isolation for the refrigerated articles stored therein.

With the present arrangement, each time the door 14 is opened or closed, air currents created thereby, or which are merely present in the area, are substantially prevented from entering any of the sub-compartments 16 inside compartment 12 by the air barrier, yet, the flaps 46 in the barrier allow the picker head 24 and the selected articles to easily pass therethrough when it is time for dispensing an article from a particular sub-compartment 16.

Figure 2A:
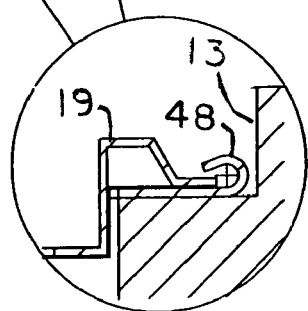

FIG. 2a shows a detail of a retaining clip 48, wherein a spaced pair of said clips 48 are glued to an inside lip of opening 13 for retaining an outer edge of portion 42 of barrier 19 in the closed position. This will prevent the upward force exerted on barrier 19 during the dispensing operation by the removal of articles from inside sub-compartments 16, from undesirably lifting the barrier 19 from its closed position over opening 13.

However, in order to quickly and easily refill sub-compartments 16 with fresh articles 18 to be dispensed, a rear portion of barrier 19 is provided with flexible hinge/tab portions 49 and 50. Hinges 49 and 50 can be secured to a rear portion of the inside lip of opening 13 using screws (not shown), in order the barrier 19 can be easily replaced if it becomes damaged.

As shown in FIGS. 2 and 3, and in detail in FIG. 3A, a hook 52 secured to the underside of door 14 is positioned so as to be able to releasable engage a front portion of barrier 19 when the barrier 19 is raised by the operator so as to provide unencumbered access to the inside of freezer 12 for refilling it with fresh articles to be dispensed. For releasing barrier 19 from hook 52, slight pressure is merely applied to the barrier so as to deform it's perimeter enough to disengage the front portion thereof from its engagement with hook 52.

Figure 5:
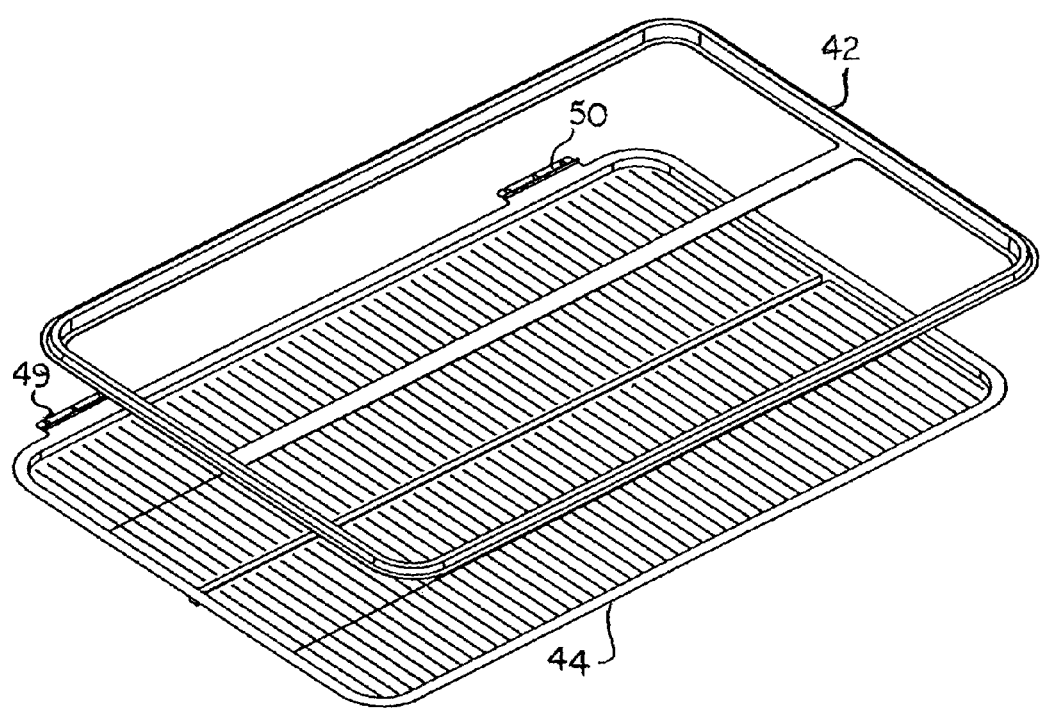
FIG. 5 illustrates one technique for manufacturing the displaceable barrier shown in FIG. 4.

FIG. 5 shows one embodiment for forming barrier 19, and comprises an outer frame portion 42, and a sheet-like inner portion 44 having the flaps 46 formed therein. In one embodiment, frame 42 could be formed using low-cost vacuum thermo-forming techniques, and comprise, for example 0.035" thick clear PVC, and portion 44 could also be formed using low-cost vacuum thermo-forming techniques, and comprise, for example 0.010" thick clear PVC. It would also be desirable that the PVC be of the type designed for use in low temperature environments, and as such, PVC designed for use at minus 40 degrees F. is commonly available. In an alternative embodiment, it may be desirable to form barrier 19 out of a single sheet of material, instead of two pieces.

Figure 6A:
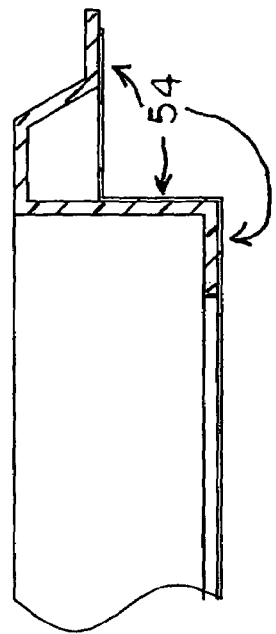
FIG. 6A illustrates a lengthwise cross-section view of the displaceable barrier shown in FIG. 4.
Figure 6B:
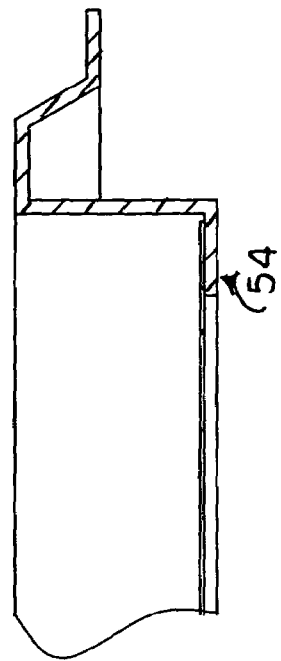
FIG. 6B illustrates a lengthwise cross-section view of an alternative embodiment thereof.

FIG. 6A illustrates a cross-section view (with hidden lines not shown) of the barrier 19 shown as comprising the assembled two portions 42 and 44. Note that the hinges 49 and 50 are formed using the more flexible and thinner material that forms portion 44, and that portion 42 has a cross-sectional shape that is intended to provide structural rigidity to the assembled barrier 19. Other cross-sectional shapes could just as easily been provided, and any specific shape is merely a matter of design choice. For example, FIG. 6B illustrates an alternative embodiment for the air barrier of the present invention, where the hinges 49 and 50 are formed by compressing a portion of portion 44 during its vacuum thermoforming, so as to provide the desired flexibility for forming the hinge areas. Additionally, in the FIG. 6B embodiment, a simpler portion 44 is used, in that it it does not require any vacuum thermoforming, and merely comprises a flat sheet of PVC having the desired shape and distribution of flaps cut therein, and then combined with frame portion 42 by, for example, using an adhesive in commonly aligned flat areas 54.

In FIGS. 6A and 6B, portions shown as 54 illustrate positions where substantially flat surface areas in the two portions 42 and 44 are aligned when assembled, thereby providing locations for using, for example an adhesive, for joining these portions together. In one embodiment, a UV curable glue could be used, so as to allow time for the portions 42 and 44 to be properly aligned before the UV curing light is provided for curing the adhesive.

Thus, one aspect of the invention is to provide a displaceable separator which is common to the open dispensing end of a plurality of the article storage compartments in an article storage area, which displaceable separator may be in addition to a further separator function, such as provided by door 14. This will allow access to selected articles in a given sub-compartment 16 of the article storage compartment 12 when the separating door, if one is used, is displaced, without exposing the remainder of the storage sub-compartments 16 to the ambient environment. Additionally, such an arrangement minimizes egress of warm air into the selected sub-compartment before, during and after the article pickup head 24 passes therethrough.

It is noted that article storage bins (not shown, but described in my above-referenced US patent) having a shape corresponding to the shape of sub-portions 16 could be individually removable from compartment 12. Furthermore, compartment 12 itself could be wholly or partially removable from inside of housing 11 in order to facilitate reloading of compartment 12 will fresh articles to be vended. More specifically, compartment 12 can be mechanically mounted and electrically connected within housing 11 so as to be at least partially removable therefrom, such as by the use of sliding tracks mounted between a bottom portion of compartment 12 and a floor portion of housing 11, so as to assist repositioning of compartment 12 to be at least partially outside of housing 11, thereby facilitating access to the interior of compartment 12 during re-loading of compartment 12 with fresh articles to be vended. If necessary, any electrical connection to compartment 12 required for operating the cooling equipment associated therewith, could be selectively disconnectable, so as to facilitate the repositioning of compartment 12.

Many variations of this invention are possible, both in the manner of forming/attaching the displaceable thermal barrier 19 in the opening of the article storage compartment 12, as well as the dimensioning, structure, shape and choice of materials for the thermal barrier 19.

For example, in an alternative embodiment of the invention, the displaceable thermal barrier of the invention could be provided redundantly, so as to possibly further improve the thermal separation of the stored articles from the ambient environment. As shown in FIG. 3, the top portion of the sub-compartments 16 are recessed below the open top of compartment 12. If the recess is great enough, two thermal barriers spaced one above the other could be used in place of the one described above. In this embodiment, the gap between the upper and lower barriers defines an air space which improves the thermal separation function provided to the articles stored inside the compartment, as compared to the thermal separation function provided by only one thermal barrier 19. The vertical spacing between each barrier could be such that the inward deflection of flaps in the upper barrier will not contact the upper side of the lower set of flaps, i.e., each set will operate independently and the upper set can substantially close before the lower set is opened. Alternatively, the barriers can be positioned relatively close to one another so that their flaps may operate in unison, yet still advantageously defining a thermally separated barrier and air gap between the inside of compartment 12 and the inside of the remainder of the housing 11.

It is also noted that the invention described herein is not limited to any specific type of article retrieving device (such as the illustrated pickup head 24). For example, it may be desirable for the robotic positioning mechanism to include a rotary device (R, θ) of the type including an I beam of fixed length (or telescopic sections), for establishing an "R" movement for pickup head 24, and where pivoting of the I beam establishes a "θ" movement. Alternatively, in other environments for the invention, the pickup head positioning mechanism may include an articulated arm or scissor system, or use a totally different dispensing technique, such a the more conventional spiral wire dispenser mechanism. Other types of suitable pickup devices include a mechanical claw or scoop, a magnetic attracting device, a portable suction generator, etc.

Furthermore, other types of storage compartments are usable in the environment of the present invention, such as article storage compartments including horizontally oriented stacks of stored articles, wherein the storage area has one or more vertically oriented openings at the dispensing end thereof. Even furthermore, in some environments, the invention may be useful with an article storage compartment that is not refrigerated, that is, the air barrier may be useful for other reasons, such as keeping dust and dirt out of the interior of compartment 12 during the times that the lid 14 is open. All that is required of the storage/dispensing arrangement is that the selected article requires passage through the dispensing end of an article storage compartment.

As noted above, while the present invention has been disclosed with reference to certain embodiments, numerous modifications, alterations and changes to the described embodiments are possible without departing from the sphere and scope of the present invention. Accordingly, it is intended that the present invention not be limited to the described embodiments, but be given the full scope defined by the above language, drawings and the claims which follow, as well as equivalents thereof.

The invention claimed is:

1. An article dispensing apparatus comprising,
a housing defining an internal cavity,
a refrigerated article storage area inside the cavity, the article storage area being subdivided into a plurality of article storage sub-compartments, each article storage sub-compartment having an opening at a dispensing end thereof for passage of stored articles therethrough during a dispensing operation; and
an air barrier arrangement comprising,
a sheet-like member having a plurality of flaps formed therein,
said sheet-like member being positioned in common with the open dispensing ends of a plurality of the article storage sub-compartments so as to provide a thermal barrier between a cooled environment inside the refrigerated article storage area and the remainder of the inside of the internal cavity, and
wherein a sub-plurality of said flaps, including a sub-plurality of only one flap, is in alignment with a corresponding one of the article storage sub-compartments, each of said sub-plurality of flaps allowing for the passage of stored articles therethrough during a dispensing operation from the corresponding one of the article storage sub-compartments that is aligned therewith.

2. The apparatus of claim 1, wherein said air barrier arrangement comprises a perimeter frame member formed of a relatively inflexible material which is attached to and supports therein a sheet-like member formed of a relatively flexible material.

3. The apparatus of claim 2, wherein said flaps have one perimeter edge which is connected in a hinged manner to the perimeter frame member, and a free edge which abuts the free edge of an opposed flap formed in the sheet-like member.

4. The apparatus of claim 3, wherein the abutting ends of the opposed flaps are substantially aligned with the center of the opening at the dispensing end of the corresponding sub-compartment aligned therewith.

5. The apparatus of claim 1, wherein the plurality of flaps of the sheet-like member are uniformly shaped and uniformly distributed in their alignment with the article storage sub-compartments.

6. The apparatus of claim 5, wherein the plurality of flaps are formed integrally with the sheet-like member.

7. The apparatus of claim 1, wherein the flaps of the sheet-like member comprise a plurality of pairs of opposed flaps, the abutting ends of the op posed flaps being substantially aligned with the center of the opening at the dispensing end of the corresponding sub-compartment aligned therewith.

8. The apparatus of claim 1, including a thermal separator which is in addition to the air barrier arrangement, said thermal separator operating in common with a plurality of said sub-compartments.

9. The apparatus of claim 8, wherein the thermal separator comprises a door connected for hinged operation over a dispensing-end opening in the article storage area.

10. The apparatus of claim 8, wherein the thermal separator comprises a laminar flow of air.

11. The apparatus of claim 10, wherein the laminar flow of air uses cooled air.

12. A barrier arrangement adapted for use in a vending machine apparatus including inside the machine a refrigerated article storage compartment for storing therein stacks of articles to be dispensed, the article storage compartment having an opening at a dispensing end thereof for passage of selected ones of the stored articles therethrough during a dispensing operation, said barrier arrangement comprising:

a sheet-like member having a plurality of flaps formed therein, said sheet-like member adapted for being positioned in common with the opening in the article storage compartment compartments so as to provide a thermal barrier between a cooled environment inside the refrigerated article storage compartment and the remainder of the inside of the machine, with a sub-plurality of said flaps being in alignment with a corresponding stack of the articles stored in the article storage compartment, each of said sub-plurality of flaps allowing for the passage of stored articles therethrough during a dispensing operation from the corresponding stack of the articles that is aligned therewith.

13. The arrangement of claim 12, wherein said barrier arrangement comprises a perimeter frame member formed of a relatively inflexible material which is attached to and supports therein a sheet-like member formed of a relatively flexible material.

14. The arrangement of claim 13, wherein said flaps have one perimeter edge which is connected in a hinged manner to the perimeter frame member, and a free edge which abuts the fee edge of an opposed flap formed in the sheet-like member.

15. The arrangement of claim 12, wherein the plurality of flaps of the sheet-like member are uniformly shaped and uniformly distributed in their alignment with the stacks of the articles stored in the article storage compartment.

16. The arrangement of claim 12, wherein the flaps of the sheet-like member comprise a plurality of pairs of opposed flaps, the abutting ends of the opposed flaps being substantially aligned with the center of the stack of the articles stored in the article storage compartment that is aligned therewith.

17. The arrangement of claim 12, wherein the plurality of flaps are formed integrally with the sheet-like member.

18. The arrangement of claim 17, wherein the abutting ends of the opposed flaps are substantially aligned with the center of the stack of the articles stored in the article storage compartment that is aligned therewith.

19. A vending machine apparatus comprising, a housing defining an internal cavity, a refrigerated article storage compartment located inside the cavity, the article storage compartment being subdivided into a plurality of article storage sub-compartments, each article storage sub-compartment having an individual opening at a dispensing end thereof which is aligned with a common opening in the refrigerated article storage compartment, said stored articles passing through said individual and common openings during a dispensing operation; and a first-type thermal separator arrangement comprising, a sheet-like member having a plurality of flaps formed therein, said sheet-like member being positioned in the common in the refrigerated article storage compartment, and wherein a sub-plurality of said flaps, including a sub-plurality of only one flap, is in alignment with a corresponding one of the article storage sub-compartments, each of said sub-plurality of flaps allowing for the selective passage of stored articles therethrough during a dispensing operation from the corresponding one of the article storage sub-compartments that is aligned therewith.

20. The apparatus of claim 19, wherein said first-type thermal separator arrangement comprises a perimeter frame member formed of a relatively inflexible material which is attached to and supports therein a sheet-like member formed of a relatively flexible material.

21. The apparatus of claim 19, wherein the plurality of flaps of the sheet-like member are uniformly shaped and uniformly distributed in the sheet-like member.

22. The apparatus of claim 19, wherein the flaps of the sheet-like member comprise a plurality of pairs of opposed flaps, the abutting ends of the opposed flaps being substantially aligned with the center of the opening at the dispensing end of the corresponding sub-compartment aligned therewith.

23. The apparatus of claim 19, including a second-type thermal separator which is in addition to the first-type thermal separator arrangement, said second-type thermal separator operating in common with a plurality of said sub-compartments.

24. The apparatus of claim 19, wherein the second-type thermal separator comprises a door connected for hinged operation over the common opening in the refrigerated article storage compartment.

25. An-article dispensing apparatus comprising, a housing defining an internal cavity, an article storage area inside the cavity, the article storage area being subdivided into a plurality of article storage sub-compartments, each article storage sub-compartment having an opening at a dispensing end thereof for passage of stored articles therethrough during a dispensing operation; and an air barrier arrangement comprising, a sheet-like member having a plurality of pairs of opposed flaps formed therein, said sheet-like member being positioned in common with the open dispensing ends of a plurality of the article storage sub-compartments so that abutting ends of the opposed flaps are substantially aligned with the center of the opening at the dispensing end of a corresponding sub-compartment aligned therewith, and wherein a sub-plurality of said flaps, including a sub-plurality of only one flap, is in alignment with a corresponding one of the article storage sub-compartments, each of said sub-plurality of flaps allowing for the passage of stored articles therethrough during a dispensing operation from the corresponding one of the article storage sub-compartments that is aligned therewith.

26. The apparatus of claim 25, wherein said air barrier arrangement comprises a perimeter frame member formed of a relatively inflexible material which is attached to and supports therein a sheet-like member formed of a relatively flexible material.

27. The apparatus of claim 25, wherein the plurality of flaps of the sheet-like member are uniformly shaped and uniformly distributed in their alignment with the article storage sub-compartments.

* * * * *